United States Patent
Sun et al.

(10) Patent No.: US 12,549,236 B2
(45) Date of Patent: Feb. 10, 2026

(54) UE CAPABILITY REPORTING

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 438 days.

(21) Appl. No.: 17/920,374

(22) PCT Filed: Nov. 4, 2021

(86) PCT No.: PCT/CN2021/128712
§ 371 (c)(1),
(2) Date: Oct. 20, 2022

(87) PCT Pub. No.: WO2023/077358
PCT Pub. Date: May 11, 2023

(65) Prior Publication Data
US 2024/0214050 A1 Jun. 27, 2024

(51) Int. Cl.
H04B 7/06 (2006.01)

(52) U.S. Cl.
CPC ......... *H04B 7/0628* (2013.01); *H04B 7/0626* (2013.01); *H04B 7/0634* (2013.01); *H04B 7/0639* (2013.01)

(58) Field of Classification Search
CPC .. H04B 7/0626; H04B 7/0639; H04B 7/0634; H04B 7/0456; H04B 7/0628
See application file for complete search history.

(56) References Cited

U.S. PATENT DOCUMENTS

2018/0102817 A1* 4/2018 Park .................... H04B 7/0417
2020/0220590 A1* 7/2020 Sun ..................... H04L 25/0391
(Continued)

FOREIGN PATENT DOCUMENTS

WO 2021027920 A1 2/2021
WO 2021203312 A1 10/2021

OTHER PUBLICATIONS

International Patent Application No. PCT/CN2021/128712, International Preliminary Report on Patentability, Mar. 16, 2024, 6 pages.

(Continued)

*Primary Examiner* — Andrew Lee
(74) *Attorney, Agent, or Firm* — Kilpatrick Townsend & Stockton LLP

(57) ABSTRACT

Provided is a method for a user equipment (UE). The UE performs at least one of: reporting, to a base station (BS), a UE capability related to port selection codebooks, in accordance with a determination that an active bandwidth part (BWP) has less than a threshold number of physical resource blocks (PRBs), operating according to a rule that the UE is not expected to report, to the BS, the port selection codebooks, or in accordance with a determination that the active BWP has less than the threshold number of PRBs and that the UE is configured with the port selection codebooks by the BS, assuming that a subset of parameters has a predefined value, wherein the parameters comprise a number, M, of selected frequency basis, a percentage, α, of number of selected ports, a percentage, β, of number of reported non-zero coefficients, and a number, R, of precoding matrix indicator (PMI) sub-bands per channel quality information (CQI) sub-band.

19 Claims, 10 Drawing Sheets

(56) References Cited

U.S. PATENT DOCUMENTS

| | | | |
|---|---|---|---|
| 2021/0194547 A1* | 6/2021 | Jin | H04B 7/0456 |
| 2021/0297134 A1 | 9/2021 | Rahman et al. | |
| 2022/0224391 A1* | 7/2022 | Ramireddy | H04B 7/0639 |
| 2022/0303076 A1* | 9/2022 | Yuan | H04L 5/0057 |
| 2023/0145057 A1* | 5/2023 | Zhang | H04L 5/0051 |
| | | | 370/329 |
| 2023/0148388 A1* | 5/2023 | Rahman | H04B 7/0404 |
| | | | 375/267 |
| 2023/0353210 A1* | 11/2023 | Hao | H04B 7/0691 |
| 2024/0056155 A1* | 2/2024 | Sun | H04W 72/232 |
| 2024/0129776 A1* | 4/2024 | Hindy | H04L 5/0035 |
| 2024/0163855 A1* | 5/2024 | Zhang | H04B 7/024 |
| 2025/0055528 A1* | 2/2025 | Muruganathan | H04W 24/10 |

OTHER PUBLICATIONS

Further Details on CSI Enhancement for Rel-17, 3GPP TSG RAN WG1 Meeting #106bis-e, R1-2109190, Oct. 11-19, 2021, 24 pages.

Remaining Issues on MU-CSI in R16, 3GPP TSG RAN WG1 Meeting #100-e, R1-2000205, Feb. 24-Mar. 6, 2020, 2 pages.

International Patent Application No. PCT/CN2021/128712, International Search Report and Written Opinion, Mailed on Apr. 26, 2022, 9 pages.

3rd Generation Partnership Project; Technical Specification Group Radio Access Network; NR; Physical layer procedures for data (Release 16), 3GPP TS 38.214 V16.7.0, Sep. 2021, 172 pages.

3rd Generation Partnership Project; Technical Specification Group Radio Access Network; NR; User Equipment (UE) radio access capabilities (Release 16), 3GPP TS 38.306 V16.6.0, Sep. 2021, 155 pages.

3rd Generation Partnership Project; Technical Specification Group Radio Access Network; NR; Radio Resource Control (RRC) protocol specification (Release 16), 3GPP TS 38.331 V16.6.0, Sep. 2021, 961 pages.

Final Report of 3GPP TSG RAN WG1 #106b-e v1.0.0 (Online meeting, Oct. 11-19, 2021), MCC Support, 3GPP TSG RAN WG1 Meeting #107-e, R1-2110751, Nov. 11-19, 2021, 153 pages.

Discussion on CSI Enhancements for Rel-17, 3Generation Partnership Project Technical Specification Group Radio Access Network Working Group1 Meeting #106bis-e , R1-2108762, Oct. 11-19, 2021, 23 pages.

Views on Rel-17 CSI Enhancement, 3Generation Partnership Project Technical Specification Group Radio Access Network Working Group1 #106b-e, R1-2110019, Oct. 11-19, 2021, 7 pages.

European Patent Application No. 21962875.7, Partial Supplementary European Search Report, Sep. 24, 2025, 15 pages.

* cited by examiner $$[w^\ell(1) \cdots w^\ell(N_3)] = \underbrace{\overbrace{(v_0 \cdots v_{L-1} \quad v_0 \cdots v_{L-1})}^{2L}}_{W_1} \underbrace{\overbrace{\begin{pmatrix} \tilde{c}_{0,1,\ell} & \cdots & \tilde{c}_{0,M,\ell} \\ \vdots & \ddots & \vdots \\ \tilde{c}_{2L-1,1,\ell} & \cdots & \tilde{c}_{2L-1,M,\ell} \end{pmatrix}}^{M}}_{W_2^\ell} \underbrace{\begin{pmatrix} w_{f,1}^H \\ \vdots \\ w_{f,M}^H \end{pmatrix}}_{W_f^H}$$

$W^\ell$

FIG. 3

| M | Alpha | Beta |
|---|---|---|
| 1 | 1 | 1 |
| 1 | 1 | 3/4 |
| 1 | 1 | 1/2 |
| 1 | 3/4 | 1/2 |
| 2 | 1 | 3/4 |
| 2 | 1 | 1/2 |
| 2 | 3/4 | 1/2 |
| 2 | 1/2 | 1/2 |

FIG. 4

UE CAPABILITY REPORTING

CROSS REFERENCE TO RELATED APPLICATION

This application is a 371 U.S. National Phase of PCT International Patent Application No. PCT/CN2021/128712, filed Nov. 4, 2021, which is herein incorporated by reference in its entirety for all purposes.

TECHNICAL FIELD

This application relates generally to wireless communication systems, and more specifically to user equipment capability reporting.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an evolved universal terrestrial radio access network (E-UTRAN) Node B (also commonly denoted as evolved Node B, enhanced Node B, eNodeB, or eNB) and/or radio network controller (RNC) in an E-UTRAN, which communicate with a wireless communication device, known as user equipment (UE). In fifth generation (5G) wireless RANs, RAN nodes can include a 5G node, new radio (NR) node or g Node B (gNB), which communicate with a wireless communication device, also known as user equipment (UE).

SUMMARY

According to an aspect of the present disclosure, a method for a user equipment (UE) is provided that includes: performing at least one of: reporting, to a base station (BS), a UE capability related to port selection codebooks, in accordance with a determination that an active bandwidth part (BWP) has less than a threshold number of physical resource blocks (PRBs), operating according to a rule that the UE is not expected to report, to the BS, the port selection codebooks, or in accordance with a determination that the active BWP has less than the threshold number of PRBs and that the UE is configured with the port selection codebooks by the BS, assuming that a subset of parameters has a predefined value, wherein the parameters comprise a number, M, of selected frequency basis, a percentage, $\alpha$, of number of selected ports, a percentage, $\beta$, of number of reported non-zero coefficients, and a number, R, of precoding matrix indicator (PMI) sub-bands per channel quality information (CQI) sub-band.

According to an aspect of the present disclosure, a method for a network device is provided that includes: performing at least one of: receiving, from a user equipment (UE), a report of a UE capability related to port selection codebooks, in accordance with a determination that an active bandwidth part (BWP) has less than a threshold number of physical resource blocks (PRBs), operating according to a rule that the BS shall not configure the UE to report the port selection codebooks, or in accordance with a determination that the active BWP has less than the threshold number of PRBs and that the UE is configured with the port selection codebooks by the BS, configuring the UE with a subset of parameters, wherein the parameters comprise a number, M, of selected frequency basis, a percentage, $\alpha$, of number of selected ports, a percentage, $\beta$, of number of reported non-zero coefficients, and a number, R, of precoding matrix indicator (PMI) sub-bands per channel quality information (CQI) sub-band.

According to an aspect of the present disclosure, an apparatus for a user equipment (UE) is provided that includes means for performing the method according to the present disclosure.

According to an aspect of the present disclosure, an apparatus of a network device is provided that includes means for performing the method according to the present disclosure.

According to an aspect of the present disclosure, apparatus for a communication device is provided that includes means for performing the method according to the present disclosure.

According to an aspect of the present disclosure, a computer readable medium is provided that has computer programs stored thereon, which when executed by one or more processors, cause an apparatus to perform steps of the method according to the present disclosure.

According to an aspect of the present disclosure, a computer program product is provided that includes computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 3 illustrates an exemplary Type II codebook selection in 3GPP release 16.

FIG. 4 illustrates an exemplary parameter combinations supported by 3GPP release 17 codebook.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless communication, codebook based precoding is a promising technology adopted by Long Term Evolution (LTE), which fixes a common codebook comprising a set of vectors and matrices at both the transmitter and the receiver. In particular, Type II port selection codebook is defined in channel state information—reference signal (CSI-RS) codebook for port selection.

Figure 1:
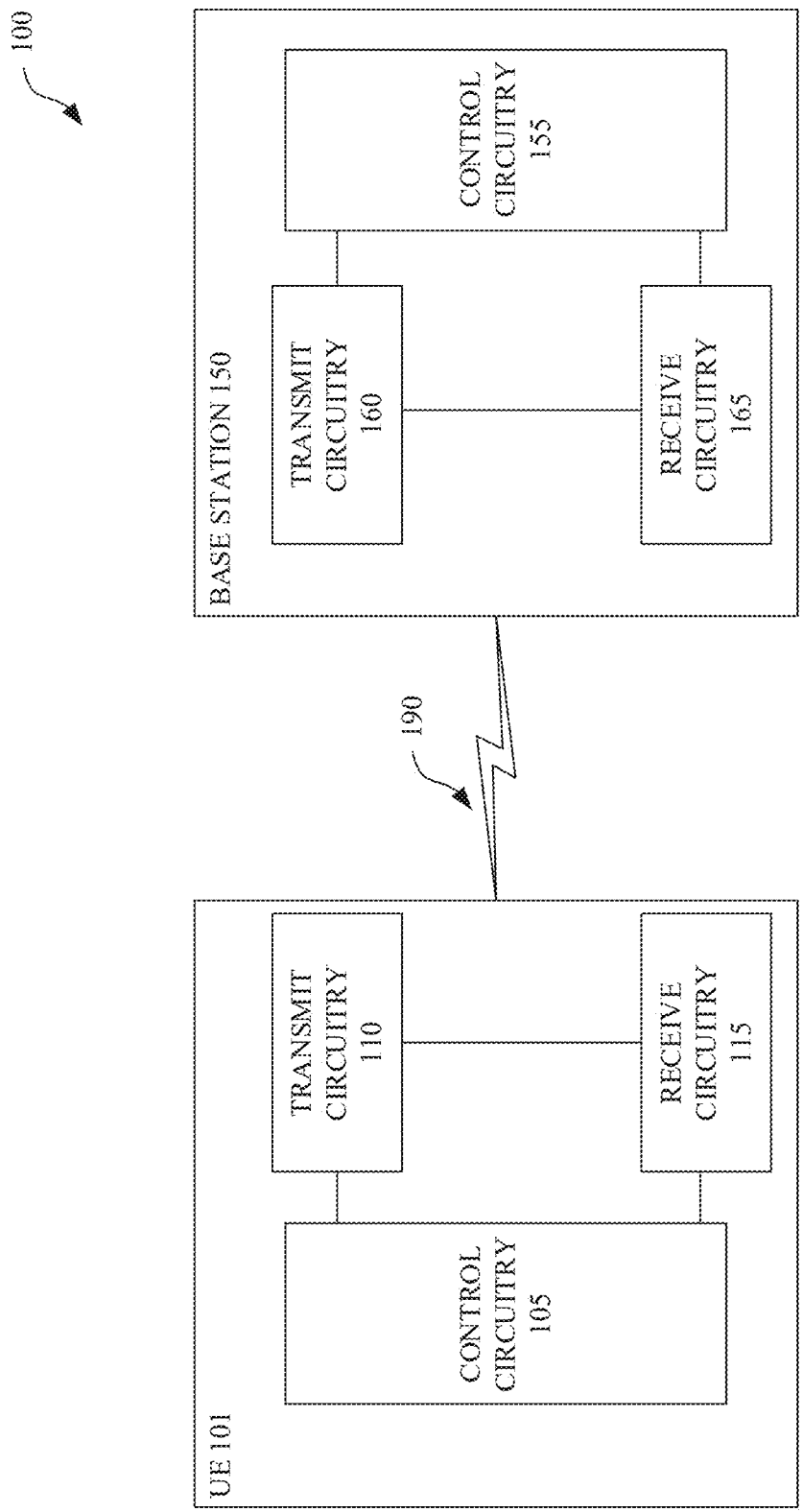
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120-degree area with an array of antennas directed to each sector to provide 360-degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person-to-person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is included of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is included of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and the network device described in the following embodiments may be implemented by the UE 101 and the base station 150 described in FIG. 1.

Figure 2:
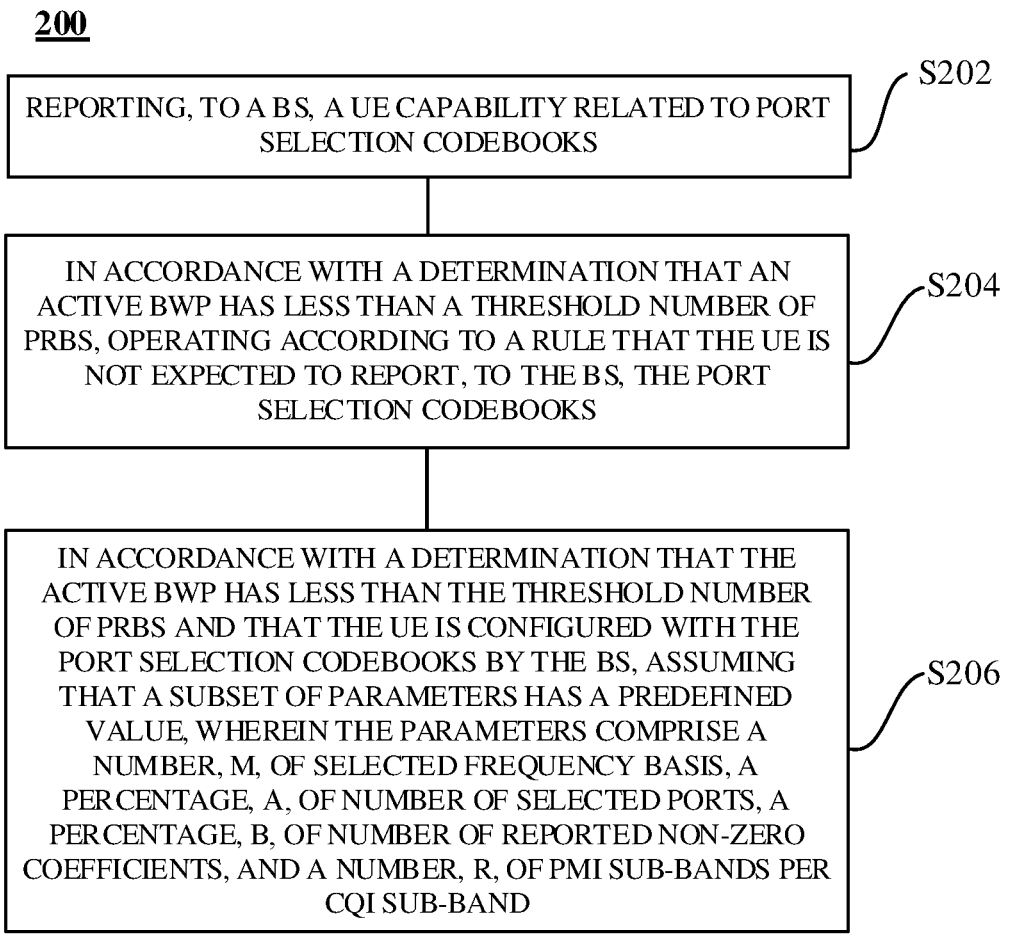
FIG. 2 illustrates a flowchart for an exemplary method for a user equipment in accordance with some embodiments.

FIG. 2 illustrates a flowchart for an exemplary method for a user equipment in accordance with some embodiments. The method 200 illustrated in FIG. 2 may be implemented by the UE 101 described in FIG. 1.

In some embodiments, the method 200 for UE may include at least one of the following steps: S202, reporting, to a base station (BS), a UE capability related to port selection codebooks; S204, in accordance with a determination that an active bandwidth part (BWP) has less than a threshold number of physical resource blocks (PRBs), operating according to a rule that the UE is not expected to report, to the BS, the port selection codebooks; or S206, in accordance with a determination that the active BWP has less than the threshold number of PRBs and that the UE is configured with the port selection codebooks by the BS, assuming that a subset of parameters has a predefined value, wherein the parameters include a number, M, of selected frequency basis, a percentage, α, of number of selected ports, a percentage, β, of number of reported non-zero coefficients, and a number, R, of precoding matrix indicator (PMI) sub-bands per channel quality information (CQI) sub-band.

According to some embodiments of the present disclosure, UE implementation complexity issues may be alleviated by capability reporting design for port selection codebook.

UE capability reporting for port selection codebook can be enhanced.

In the following, each step of the method 200 will be described in details.

At step S202, a UE capability related to port selection codebooks is reported by the UE to a base station (BS).

According to some embodiments, the UE capability related to the port selection codebooks may include at least one of:

a UE capability related to parameter combinations, the parameter combinations comprising:
M=1, α=1, and β=1;
M=1, α=1, and β=¾;
M=1, α=1, and β=½;
M=1, α=¾, and β=½;
M=2, α=1, and β=¾;
M=2, α=1, and B=½;
M=2, α=¾, and β=1/2; and
M=2, α=½, and β=½;

a UE capability related to sub-band oversampling with R=2; or a UE capability related to concurrent mixed codebook.

According to some embodiments, the UE capability related to the port selection codebooks may include the UE capability related to parameter combinations. UE capability related to parameter combinations may include combinations as discussed above, and further details thereof will be explained in the following.

3GPP release 15 (Rel-15) type II port selection codebook provides beam-formed CSI-RSs to exploit downlink (DL) and uplink (UL) channel reciprocity. There may be a total X number of CSI-RS ports, X/2 of which are horizontal polarization (H-pol), which is the shape/size of the beam side to side, and X/2 of which are vertical polarization (V-pol), which is the shape/size of the beam up and down. L CSI-RS ports are selected out of X/2 CSI-RS ports. The first CSI-RS port can be selected every d ports, d is either 1 or 2 or 3 or 4. Then, consecutive L (1, 2, 4) ports are selected with wrap around.

3GPP release 16 (Rel-16) provides type II port selection codebook enhancement. In Rel-16, the port selection design may be provided as in Rel-15. Further, in Rel-16, when a subband PMI is configured, frequency domain DFT matrix may be used to compress the linear combination coefficient. FIG. 3 shows an exemplary Rel-16 Type II codebook selection, where $w_i$ represents spatial basis, $w_2^c$ represents compressed combination coefficients, and $w_f^H$ represents M frequency basis.

For type II port selection codebook, it is assumed that gNB will precode the CSI-RS based on channel reciprocity, i.e., DL channel estimated based on UL channel. For frequency division duplex (FDD), exact channel reciprocity does not exist, especially when duplexing distance is large. However, even for FDD, partial reciprocity still exists. For example, angles of arrival or departure are similar between DL and UL carrier, and channel delay profiles are similar between DL and UL carrier.

In 3GPP release 17 (Rel-17) further enhanced multiple input multiple output (FeMIMO), it is agreed to further enhance the port selection codebook. Therefore, UE capability related to Rel-17 port selection codebook and concurrent mixed codebook are further needed. For example, the port selection codebooks as described above may be 3GPP Rel-17 codebooks.

According the embodiments, UE implementation complexity issues may be alleviated by capability reporting design for port selection codebook. In particular, UE capability reporting design may involve UE capability related to parameter combinations, UE capability related to R (sub-band oversampling), UE capability related to concurrent mixed codebook, and/or support of narrow band.

As discussed above, the following agreement on parameters are reached in the last RAN1 meeting, i.e., RAN1 #106bis:

M: number of selected frequency basis
α: Percentage of number of selected ports
β: Percentage of number of reported Non-Zero Coefficients (NZC).

Referring to FIG. 4 for example, where the parameter combinations supported in the Rel-17 port selection (PS) codebook are shown. According to the agreements, with respect to parameter combinations, the 8 parameter combinations are supported in Rel-17 PS codebook. For further study, where further restrictions or dependences for given parameter combination(s) are needed is under discussion.

In some embodiments, the reporting may include reporting support of each of the parameter combinations independently in accordance with a determination that the UE supports the port selection codebooks. In other words, when UE supports the port selection codebooks, UE may report the support of each parameter setting independently. Optionally, the support of the parameter combinations is reported using an 8-bit bitmap. That is, the capability reporting may be done by an 8-bit bitmap.

In some embodiments, the UE is mandated to support a subset of the parameter combinations as basic parameter settings in accordance with a determination that the UE supports the port selection codebooks. In other words, in such exemplary embodiments, when UE supports the port selection codebooks, support of some parameter settings are basic features. Optionally, the basic parameter settings include the parameter combinations in which M=1. For example, all the parameter combinations where M=1 is supported, e.g., the first, second, third, and fourth rows of the parameter setting table as shown in FIG. 4, are mandatory for the UE as basic features.

According to some embodiments, the reporting may include separately reporting whether the UE supports at least one of the parameter combinations in which M=2 in accordance with a determination that the UE supports the port selection codebooks. In such embodiments, when UE supports the port selection codebooks, UE can separately report whether UE supports M=2. Further, when UE reports UE supports M=2, the following exemplary options may be provided.

In some exemplary embodiments, in accordance with a determination that the UE supports at least one of the parameter combinations in which M=2, the UE is to support all the parameter combinations in which M=2. For example, in that case, UE has to support all the parameter settings for M=2, i.e., the parameter combinations on the 5th, 6th, 7th, 8th rows of the parameter setting table as shown in FIG. 4.

In some other exemplary embodiments, in accordance with a determination that the UE supports at least one of the parameter combinations in which M=2, the UE is to separately report whether the UE supports $\beta=3/4$ or $\beta=1/2$. In that case, in reporting a UE capability where parameter M=2 is supported, UE can separately report whether UE support $\beta=3/4$ or $\beta=1/2$ Alternatively, in accordance with a determination that the UE supports at least one of the parameter combinations in which M=2, the UE is to separately report whether the UE supports $\alpha=1$, $\alpha=3/4$, or $\alpha=1/2$. In that case, in reporting a UE capability where parameter M=2 is supported, UE may separately report whether UE support $\alpha=1$, $\alpha=3/4$, or $\alpha=1/2$.

According to other alternative embodiments, in accordance with a determination that the UE supports at least one of the parameter combinations in which M=2, the UE is to report that the UE supports which one or more of the parameter combinations in which M=2 using a bitmap. In that case, in reporting a UE capability where parameter M=2 is supported, UE may use a bitmap to indicate which parameter setting UE can support. Optionally, the bitmap may be a 4-bit bitmap.

According to some embodiments, the UE capability related to the port selection codebooks may include the UE capability related to sub-band oversampling with R=2. This involves situations on subband oversampling.

For example, in the RAN1 meeting, i.e., RAN1#106bis, the following agreements are further reached:
 R is used to configure the number of PMI subbands per CQI subband; and
 For Rel-17 Port Selection codebook, cases where R=1 and R=2 can be supported.

According to some embodiments, in accordance with a determination that the UE supports R=2 for the port selection codebooks, the reporting may include separately reporting at least one list of triplets related to UE complexity, where each triplet includes {a maximum number of transmit (Tx) ports in one CSI-RS resource, a maximum number of CSI-RS resources, and a maximum total number of Tx ports in all CSI-RS resources} across all component carriers (CCs). In such embodiments, when UE indicates that UE supports R=2 for the port selection codebooks, UE may separately indicate the UE complexity related capability by a list of multiple triplets, where each triplet contains a maximum number of Tx ports in one CSI-RS resource, a maximum number of CSI-RS resources, and maximum total number of Tx ports in all CSI-RS resources across all CCs.

Alternatively, the at least one list of triplets may include only one list of triplets that is the same for the parameter combinations in which M=1 and the parameter combinations in which M=2. In such embodiments, in a case where UE indicates that UE supports cases where R=2 for the port selection codebooks by reporting the supported list of triplets, only one list of triplets may be supported, which list is the same for M=1 and M=2. According to some other embodiments, the at least one list of triplets may include two lists of triplets, one of the two lists of triplets for the parameter combinations in which M=1, and another one of the two lists of triplets for the parameter combinations in which M=2.

According to some embodiments, in accordance with a determination that the UE supports R=2 for the port selection codebooks, the reporting may include reporting that the UE supports R=2 irrespective of a value of M. In such embodiments, when UE indicates that UE supports R=2 for the port selection codebooks, UE may support R=2 irrespective of M.

According to some other embodiments, in accordance with a determination that the UE supports R=2 for the port selection codebooks, the reporting may include independently reporting whether the UE supports R=2 for the parameter combinations in which M=1 or the parameter combinations in which M=2. In such embodiments, when UE indicates that UE supports R=2 for the port selection codebooks, UE may independently report whether UE supports R=2 for M=1 or M=2.

According to some embodiments, in accordance with a determination that the UE supports R=2 for the port selection codebooks, the UE is not to report a list of triplets related to UE complexity, where the UE supports a same list of triplets related to the UE complexity irrespective of R=1 or R=2.

When UE indicates that UE supports R=2 for the port selection codebooks, UE may not report list of triplets related to the UE complexity. In other words, the UE supported list of triplets is independent of R=1 or R=2, i.e., UE has to support the same list of triplets irrespective of R=1 or R=2 configuration.

According to some alternative embodiments, in accordance with a determination that the UE supports R=2 for the port selection codebooks, the reporting may include reporting that the UE only supports R=2 for a subset of the parameter combinations.

In such a case, UE may only support R=2 for certain parameter settings. For example, UE only supports R=2 for M=2, i.e., the 5th, 6th, 7th, 8th row of the parameter setting table as shown in FIG. 4. For another example, in a case that parameter combinations where M=1, i.e., the first, second, third, and fourth row of the parameter setting table as shown in FIG. 4, are supported by UE, parameters where R=2 may not be supported by UE.

According to some embodiments, the subset of the parameter combinations includes the parameter combinations in which M=2.

According to some embodiments, the UE capability related to the port selection codebooks may include the UE capability related to concurrent mixed codebook. As discussed above, there may be four codebooks in Rel-15, two codebooks in Rel-16, and one codebook in Rel-17, respectively, and the UE capability related to concurrent mixed codebook may be reported.

According to some embodiments, the reporting may include reporting whether the UE supports the BS to configure concurrent mixed codebook involving the Rel-17 port selection codebooks. In other words, UE may report whether UE supports network to configure concurrent mixed codebook involving Rel-17 PS Codebook.

According to some embodiments, in accordance with a determination that the UE supports the BS to configure the concurrent mixed codebook involving the port selection codebooks, the UE is to report a list of supported codebook pairs.

Additionally, or alternatively, restrictions can be put on the codebook pairs. In some embodiments, one entry of each codebook pair is a Rel-17 codebook, and another entry of each codebook pair is subject to a restriction comprising at least one of: that the another entry is not a 3GPP Rel-15 port selection codebook or a 3GPP Rel-16 port selection codebook, or that the another entry is of at least one of following codebook types: Rel-15 type I single panel, Rel-15 type I multipanel, Rel-15 type II, or Rel-16 type II.

In such embodiments, in a case where one entry of the codebook pair is Rel-17 PS codebook, the other entry may have one or more restrictions. For example, the one or more of restrictions may include that the other entry may not be a Rel-15 PS codebook or a Rel-16 PS codebook. The one or more of restrictions may additionally or alternatively include that the other entry may contain any or a subset of the following other codebook types including Rel-15 type I single panel, Rel-15 type I multipanel, Rel-15 type II or Rel-16 type II.

According to some embodiments, in accordance with a determination that the UE does not report a capability of supporting the BS to configure the concurrent mixed codebook involving the port selection codebooks, or that the reported capability does not contain a given codebook pair, the UE is to measure different codebooks in the given codebook pair at non-overlapping times.

In such embodiments, UE reports whether UE supports network to configure concurrent mixed codebook involving the PS codebook. If UE does not report this capability, or the reported capability does not contain certain codebook pair, network may not configure the corresponding codebook pair concurrently. That is, the UE is expected to be configured to measure different codebook in the corresponding codebook pair at non-overlapping times.

According to some embodiments, in accordance with a determination that the UE supports the BS to configure the concurrent mixed codebook involving the port selection codebooks, the UE is to report at least one list of triplets related to UE complexity, where each triplet includes {a maximum number of transmit (Tx) ports in one CSI-RS resource, a maximum number of CSI-RS resources, a maximum total number of Tx ports in all CSI-RS resources} across all CCs. In other words, UE may report whether UE supports network to configure concurrent mixed codebook involving the PS codebook by means of a list of triplets related to UE processing complexity. Each triplet may contain a maximum number of Tx ports in one CSI-RS resource, a maximum number of CSI-RS resources, and a maximum total number of Tx ports in all CSI-RS resources across all CCs. Some optionally examples are discussed below.

According to some embodiments, only one list of triplets is reported and applies to all supported codebook pairs. In other words, the only one list of triplets may cover all the CSI-RS resources configured for both codebooks in the codebook pairs. Alternatively, a separate list of triplets is reported for each supported codebook pair independently. In such a case, the lists of triplets may cover all the CSI-RS resources configured for both codebooks in the codebook pairs.

In some other embodiments, a separate list of triplets is reported for each codebook in each supported codebook pair independently. In such embodiments, separate list of triplets can be reported for each codebook in each supported codebook pairs independently. For each codebook pair, separate list of triplets can be reported for each codebook in the pair. Optionally, multiple pairs of the list of triplets are reported for each codebook pair.

At step S204, in accordance with a determination that an active BWP has less than a threshold number of PRBs, the UE operates according to a rule that the UE is not expected to report, to the BS, the port selection codebooks.

At step S206, in accordance with a determination that the active BWP has less than the threshold number of PRBs and that the UE is configured with the port selection codebooks by the BS, the UE assumes that a subset of parameters has a predefined value, wherein the parameters include a number, M, of selected frequency basis, a percentage, $\alpha$, of number of selected ports, a percentage, $\beta$, of number of reported non-zero coefficients, and a number, R, of PMI sub-bands per CQI sub-band.

According to some embodiments, the threshold number may be 24. In that case, when the number of PRBs is less than 24, it can be regarded as a situation of supporting of narrow band. For one example, when the active BWP has less than 24 PRBs, the PS codebook is not reported, which means UE may not be configured to report the PS codebook. For another example, when the active BWP has less than 24 PRBs, the PS codebook may be configured with some restrictions thereon. Restrictions may include, e.g., that only certain parameter setting can be configured, for example only a parameter combination where M=1, R=1 and B=1.

Figure 5:
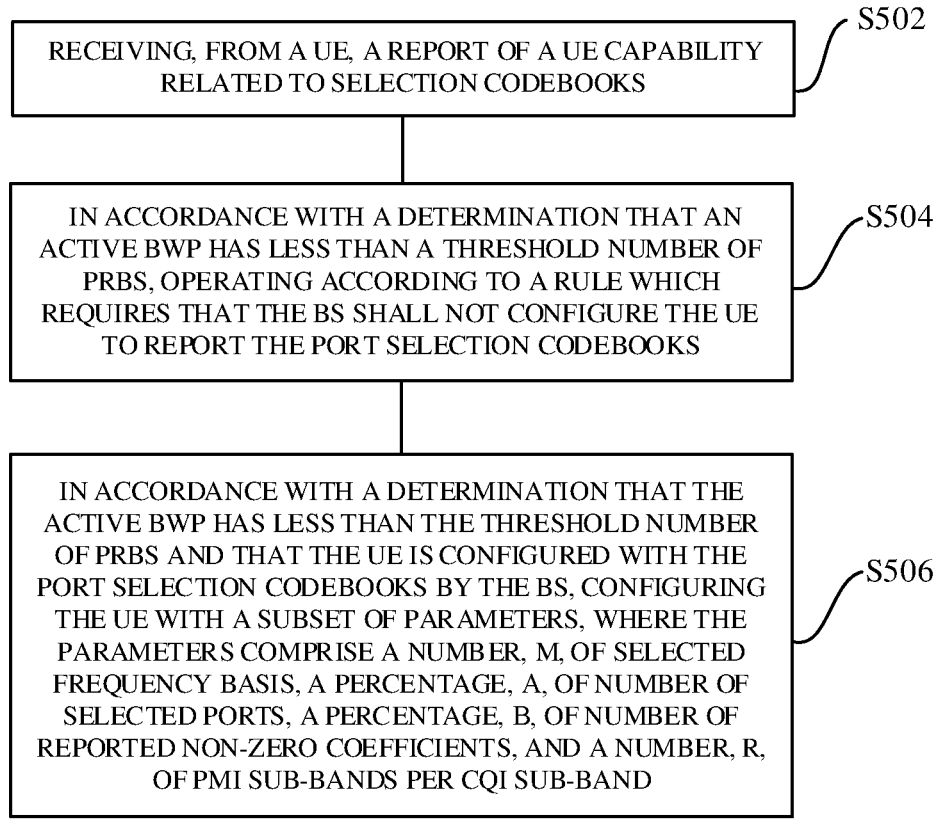
FIG. 5 illustrates a flowchart for an exemplary method for a network device in accordance with some embodiments.

FIG. 5 illustrates a flowchart for an exemplary method for a network device in accordance with some embodiments. The method 500 illustrated in FIG. 5 may be implemented by the base station 150 described in FIG. 1. For example, the network device may be the network device of the base station 150.

In some embodiments, the method 500 for a network device may include at least one of the following steps: S502, receiving, from a user equipment (UE), a report of a UE capability related to port selection codebooks: S504 in accordance with a determination that a BWP has less than a threshold number of PRBs, operating according to a rule that the BS shall not configure the UE to report the port selection codebooks; or S506, in accordance with a determination that the active BWP has less than the threshold number of PRBs and that the UE is configured with the port selection codebooks by the BS, configuring the UE with a subset of parameters, where the parameters comprise a number, M, of selected frequency basis, a percentage, $\alpha$, of number of selected ports, a percentage, $\beta$, of number of reported non-zero coefficients, and a number, R, of PMI sub-bands per CQI sub-band.

According to some embodiments, UE implementation complexity issues may be alleviated for the network by capability reporting design for the PS codebook.

In the following, each step of the method 500 will be described in detail.

At step S502, the BS receives, from a UE, a report of a UE capability related to port selection codebooks.

According to some embodiments, the UE capability related to the port selection codebooks may include at least one of:

a UE capability related to parameter combinations, the parameter combinations comprising:

M=1, $\alpha$=1, and $\beta$=1;
M=1, $\alpha$=1, and $\beta$=¾;
M=1, $\alpha$=1, and B=½;
M=1, $\alpha$=¾, and B=½;
M=2, $\alpha$=1, and B=¾;
M=2, $\alpha$=1, and B=½;
M=2, $\alpha$=¾, and B=½; and
M=2, $\alpha$=½, and B=½;

a UE capability related to sub-band oversampling with R=2; or a UE capability related to concurrent mixed codebook.

According to some embodiments, the UE capability related to the port selection codebooks may include the UE capability related to parameter combinations.

In some embodiments, the UE may support the port selection codebooks, and the report of the UE capability may indicate support of each of the parameter combinations independently.

In some embodiments, the UE may support the port selection codebooks, and the UE is mandated to support a subset of the parameter combinations as basic parameter settings.

According to some embodiments, the UE may support the port selection codebooks, and the report of the UE capability may indicate whether the UE supports at least one of the parameter combinations in which M=2.

According to some embodiments, the UE capability related to the port selection codebooks may include the UE capability related to sub-band oversampling with R=2.

According to some embodiments, the UE may support R=2 for the port selection codebooks, and the report of the UE capability may indicate at least one list of triplets related to UE complexity, each triplet includes {a maximum number of transmit (Tx) ports in one channel state information reference signal (CSI-RS) resource, a maximum number of CSI-RS resources, a maximum total number of Tx ports in all CSI-RS resources} across all component carriers (CCs).

Alternatively, the at least one list of triplets may include only one list of triplets that is the same for the parameter combinations in which M=1 and the parameter combinations in which M=2. According to some other embodiments, the at least one list of triplets may include two lists of triplets, one of the two lists of triplets for the parameter combinations in which M=1, and another one of the two lists of triplets for the parameter combinations in which M=2.

According to some embodiments, the UE may support R=2 for the port selection codebooks, and the report of the UE capability may indicate that the UE supports R=2 irrespective of a value of M.

According to some other embodiments, the UE may support R=2 for the port selection codebooks, and the report of the UE capability independently may indicate whether the UE supports R=2 for the parameter combinations in which M=1 or the parameter combinations in which M=2.

According to some embodiments, the UE may support R=2 for the port selection codebooks, and the report of the UE capability does not indicate a list of triplets related to UE complexity, where the UE supports a same list of triplets related to the UE complexity irrespective of R=1 or R=2.

According to some alternative embodiments, the UE may support R=2 for the port selection codebooks, and the report of the UE capability may indicate that the UE only supports R=2 for a subset of the parameter combinations.

According to some embodiments, the UE capability related to the port selection codebooks may include the UE capability related to concurrent mixed codebook.

According to some embodiments, the report of the UE capability may indicate whether the UE supports the BS to configure concurrent mixed codebook involving the port selection codebooks.

According to some embodiments, the report of the UE capability may not include a report of a capability of supporting the BS to configure the concurrent mixed codebook involving the port selection codebooks, or may not contain a given codebook pair.

According to some embodiments, the UE may support the BS to configure the concurrent mixed codebook involving the port selection codebooks, and the report of the UE capability may indicate at least one list of triplets related to UE complexity, each triplet includes {a maximum number of transmit (Tx) ports in one channel state information reference signal (CSI-RS) resource, a maximum number of CSI-RS resources, a total number of Tx ports in all CSI-RS resources} across all component carriers (CCs).

At step S504 in accordance with a determination that an active BWP has less than a threshold number of PRBs, the BS operates according to a rule that the BS shall not configure the UE to report the port selection codebooks.

At step S506, in accordance with a determination that the active BWP has less than the threshold number of PRBs and that the UE is configured with the port selection codebooks by the BS, the BS configures the UE with a subset of parameters, where the parameters comprise a number, M, of selected frequency basis, a percentage, $\alpha$, of number of selected ports, a percentage, $\beta$, of number of reported non-zero coefficients, and a number, R, of PMI sub-bands per CQI sub-band.

According to some embodiments, the threshold number may be 24.

Figure 6:
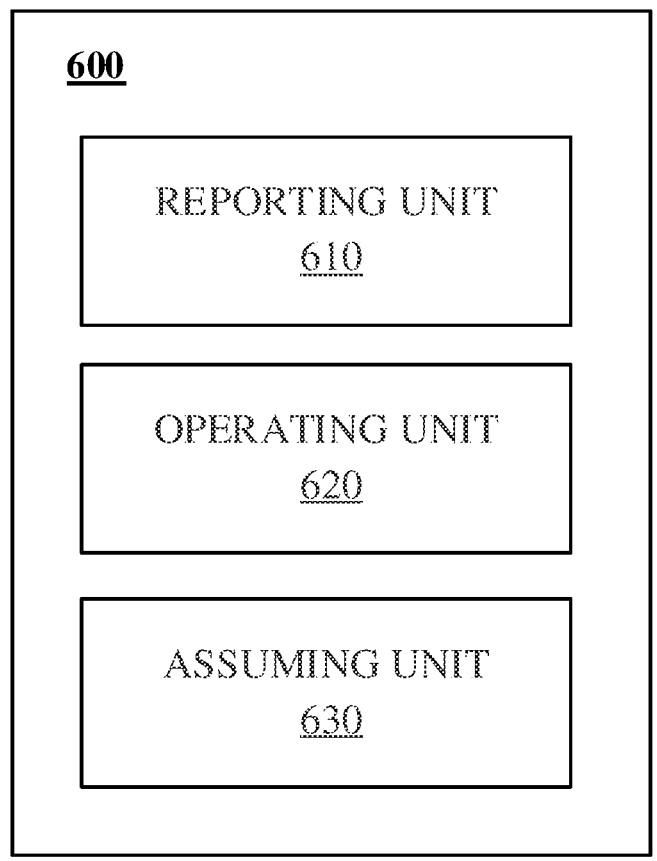
FIG. 6 illustrates an exemplary block diagram of an apparatus for a UE in accordance with some embodiments.

FIG. 6 illustrates an exemplary block diagram of an apparatus for a user equipment (UE) in accordance with some embodiments. The apparatus 600 illustrated in FIG. 6 may be used to implement the method 200 as illustrated in combination with FIG. 2.

As illustrated in FIG. 6, the apparatus 600 includes a reporting unit 610, an operating unit 620 and an assuming unit 630.

The reporting unit 610 may be configured to report, to a base station (BS), a UE capability related to port selection codebooks.

The operating unit 620 may be configured to operate, in accordance with a determination that an active BWP has less than a threshold number of PRBs, according to a rule that the UE is not expected to report, to the BS, the port selection codebooks.

The assuming unit 630 may be configured to assume, in accordance with a determination that the active BWP has less than the threshold number of PRBs and that the UE is configured with the port selection codebooks by the BS, that a subset of parameters has a predefined value, wherein the parameters include a number, M, of selected frequency basis, a percentage, $\alpha$, of number of selected ports, a percentage, $\beta$, of number of reported non-zero coefficients, and a number, R, of PMI sub-bands per CQI sub-band.

According to the embodiments of the present application, UE implementation complexity issues may be alleviated by capability reporting design for the Port Selection Codebook.

Figure 7:
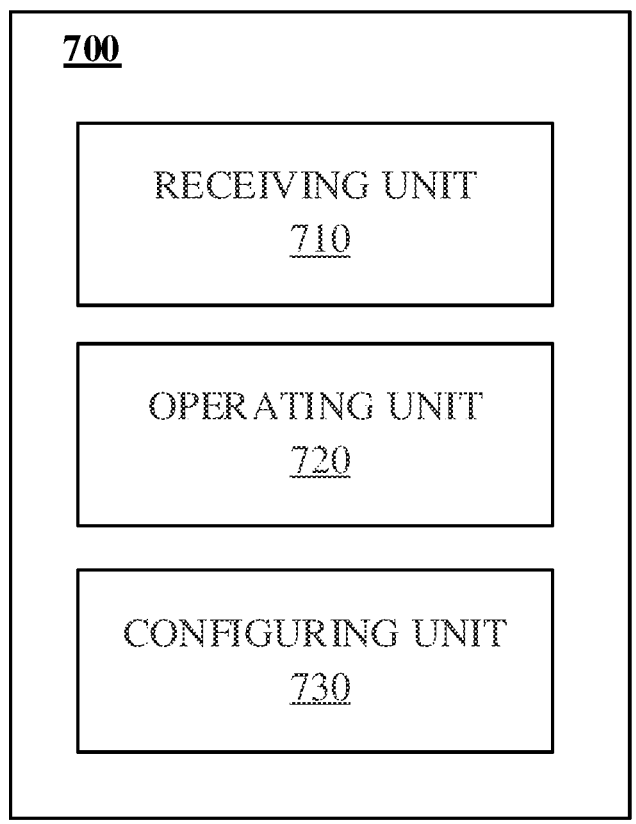
FIG. 7 illustrates an exemplary block diagram of an apparatus for a network device in accordance with some embodiments.

FIG. 7 illustrates an exemplary block diagram of an apparatus for a network in accordance with some embodiments. The apparatus 700 illustrated in FIG. 7 may be used to implement the method 500 as illustrated in combination with FIG. 5.

As illustrated in FIG. 7, the apparatus 700 includes at least one of a receiving unit 710, an operating unit 720, and a configuring unit 730.

The receiving unit 710 may be configured to receive, from a user equipment (UE), a report of a UE capability related to port selection codebooks.

The operating unit 720 may be configured to operate, in accordance with a determination that an active BWP has less than a threshold number of PRBs, according to a rule that the BS shall not configure the UE to report the port selection codebooks.

The configuring unit 730 may be configured to configure, in accordance with a determination that the active BWP has less than the threshold number of PRBs and that the UE is configured with the port selection codebooks by the BS, UE with a subset of parameters, where the parameters comprise a number, M, of selected frequency basis, a percentage, $\alpha$, of number of selected ports, a percentage, $\beta$, of number of reported non-zero coefficients, and a number, R, of PMI sub-bands per CQI sub-band.

In some embodiments, also disclosed is an apparatus for a UE, the apparatus comprising one or more processors configured to perform the method for a user equipment in accordance with any of the disclosed embodiments.

In some embodiments, also disclosed is an apparatus for a BS, the apparatus comprising one or more processors configured to perform the method for a network device in accordance with any of the disclosed embodiments.

In some embodiments, also disclosed is an apparatus for a communication device, comprising means for performing the method for a user equipment and/or the method for a network device in accordance with any of the disclosed embodiments.

In some embodiments, also disclosed is a computer readable medium having computer programs stored thereon which, when executed by an apparatus having one or more processors, cause the apparatus to perform the method for a user equipment and/or the method for a network device in accordance with any of the disclosed embodiments.

In some embodiments, also disclosed is a computer program product comprising computer programs which, when executed by an apparatus having one or more processors, cause the apparatus to perform the method for a user equipment and/or the method for a network device in accordance with any of the disclosed embodiments.

According to some embodiments of the present disclosure, UE implementation complexity issues may be alleviated for the network by capability reporting design for the Port Selection Codebook.

Figure 8:
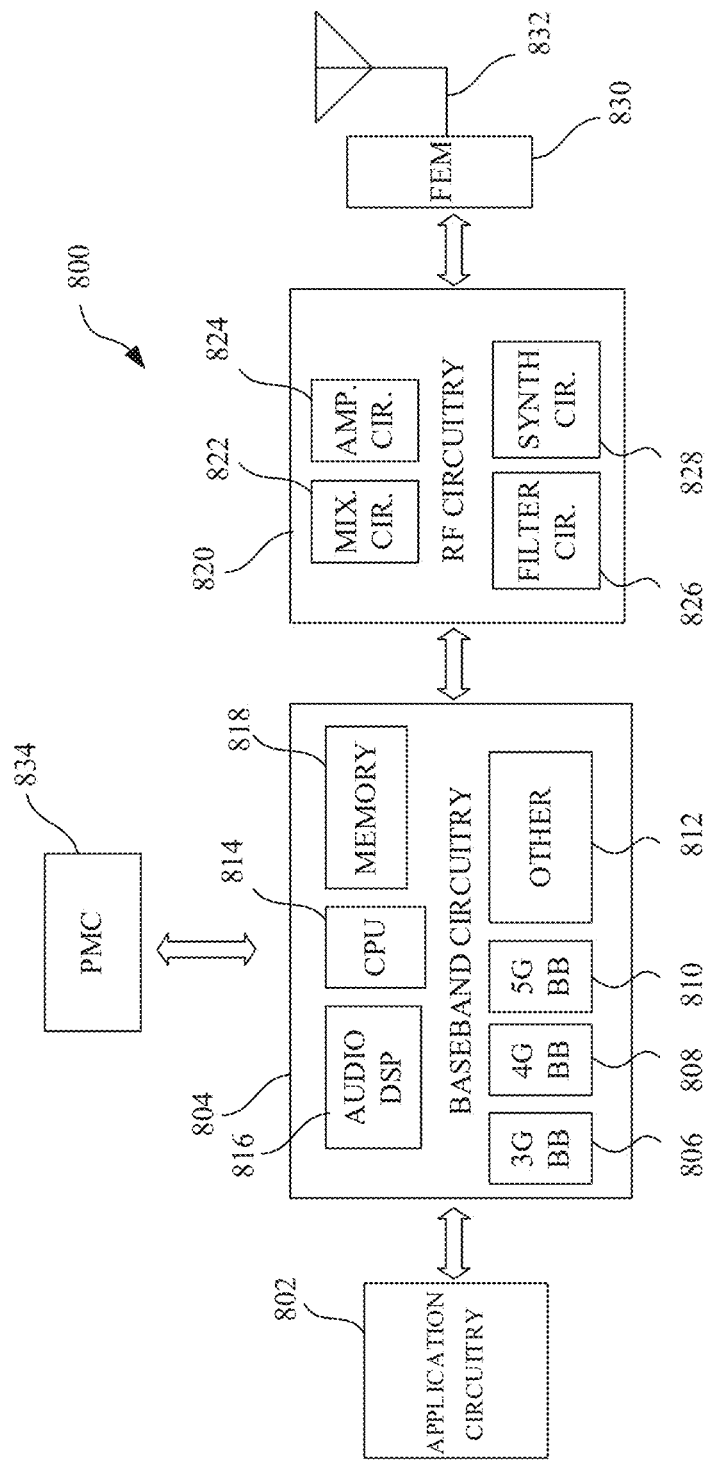
FIG. 8 illustrates example components of a device in accordance with some embodiments.

FIG. 8 illustrates example components of a device 800 in accordance with some embodiments. In some embodiments, the device 800 may include application circuitry 802, baseband circuitry 804, Radio Frequency (RF) circuitry (shown as RF circuitry 820), front-end module (FEM) circuitry (shown as FEM circuitry 830), one or more antennas 832, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 820 and to generate baseband signals for a transmit signal path of the RF circuitry 820. The baseband circuitry 804 may interface with the application circuitry 802 for generation and processing of the baseband signals and for controlling operations of the RF circuitry 820. For example, in some embodiments, the baseband circuitry 804 may include a third generation (3G) baseband processor 806, a fourth generation (4G) baseband processor 808, a fifth generation (5G) baseband processor 810, or other baseband processor(s) 812 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 820. In other embodiments, some or all of the functionality of the illustrated baseband processors may be included in modules stored in the memory 818 and executed via a central processing unit (CPU) 814. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 816. The one or more audio DSP(s) 816 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 820 may enable communication with wireless networks using modulated electromagnetic radiation through a non-solid medium. In various embodiments, the RF circuitry 820 may include switches, filters, amplifiers, etc. to facilitate the communication with the wireless network. The RF circuitry 820 may include a receive signal path which may include circuitry to down-convert RF signals received from the FEM circuitry 830 and provide baseband signals to the baseband circuitry 804. The RF circuitry 820 may also include a transmit signal path which may include circuitry to up-convert baseband signals provided by the baseband circuitry 804 and provide RF output signals to the FEM circuitry 830 for transmission.

In some embodiments, the receive signal path of the RF circuitry 820 may include mixer circuitry 822, amplifier circuitry 824 and filter circuitry 826. In some embodiments, the transmit signal path of the RF circuitry 820 may include filter circuitry 826 and mixer circuitry 822. The RF circuitry 820 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 830 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may include passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 830. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 820 may include analog-to-digital converter (ADC) and digital-to-analog converter (DAC) circuitry and the baseband circuitry 804 may include a digital baseband interface to communicate with the RF circuitry 820.

In some dual-mode embodiments, a separate radio IC circuitry may be provided for processing signals for each spectrum, although the scope of the embodiments is not limited in this respect.

In some embodiments, the synthesizer circuitry 828 may be a fractional –N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer including a phase-locked loop with a frequency divider.

The synthesizer circuitry 828 may be configured to synthesize an output frequency for use by the mixer circuitry 822 of the RF circuitry 820 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 828 of the RF circuitry 820 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 820 may include an IQ/polar converter.

The FEM circuitry 830 may include a receive signal path which may include circuitry configured to operate on RF signals received from one or more antennas 832, amplify the received signals and provide the amplified versions of the received signals to the RF circuitry 820 for further processing. The FEM circuitry 830 may also include a transmit signal path which may include circuitry configured to amplify signals for transmission provided by the RF circuitry 820 for transmission by one or more of the one or more antennas 832. In various embodiments, the amplification through the transmit or receive signal paths may be done solely in the RF circuitry 820, solely in the FEM circuitry 830, or in both the RF circuitry 820 and the FEM circuitry 830.

In some embodiments, the FEM circuitry 830 may include a TX/RX switch to switch between transmit mode and receive mode operation. The FEM circuitry 830 may include a receive signal path and a transmit signal path. The receive signal path of the FEM circuitry 830 may include an LNA to amplify received RF signals and provide the amplified received RF signals as an output (e.g., to the RF circuitry 820). The transmit signal path of the FEM circuitry 830 may include a power amplifier (PA) to amplify input RF signals (e.g., provided by the RF circuitry 820), and one or more filters to generate RF signals for subsequent transmission (e.g., by one or more of the one or more antennas 832).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in an EGE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 802, the RF circuitry 820, or the FEM circuitry 830.

In some embodiments, the PMC 834 may control, or otherwise be part of, various power saving mechanisms of the device 800. For example, if the device 800 is in an RRC Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 9:
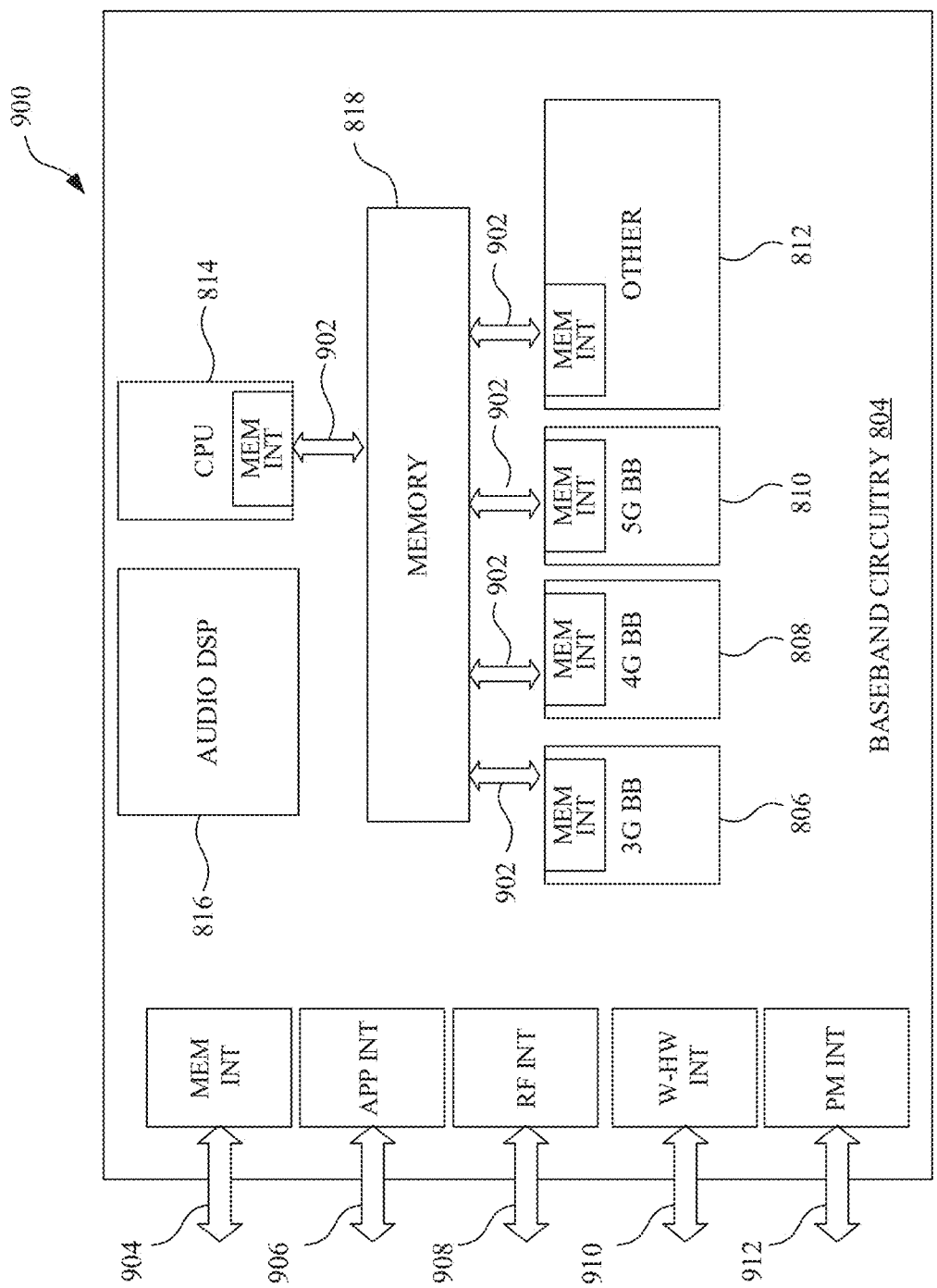
FIG. 9 illustrates example interfaces of baseband circuitry in accordance with some embodiments.

FIG. 9 illustrates example interfaces 900 of baseband circuitry 804 in accordance with some embodiments. As discussed above, the baseband circuitry 804 of FIG. 8 may include 3G baseband processor 806, 4G baseband processor 808, 5G baseband processor 810, other baseband processor(s) 812, CPU 814, and a memory 818 utilized by said processors. As illustrated, each of the processors may include a respective memory interface 902 to send/receive data to/from the memory 818.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 802 of FIG. 8), an RF circuitry interface 908 (e.g., an interface to send/receive data to/from RF circuitry 820 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
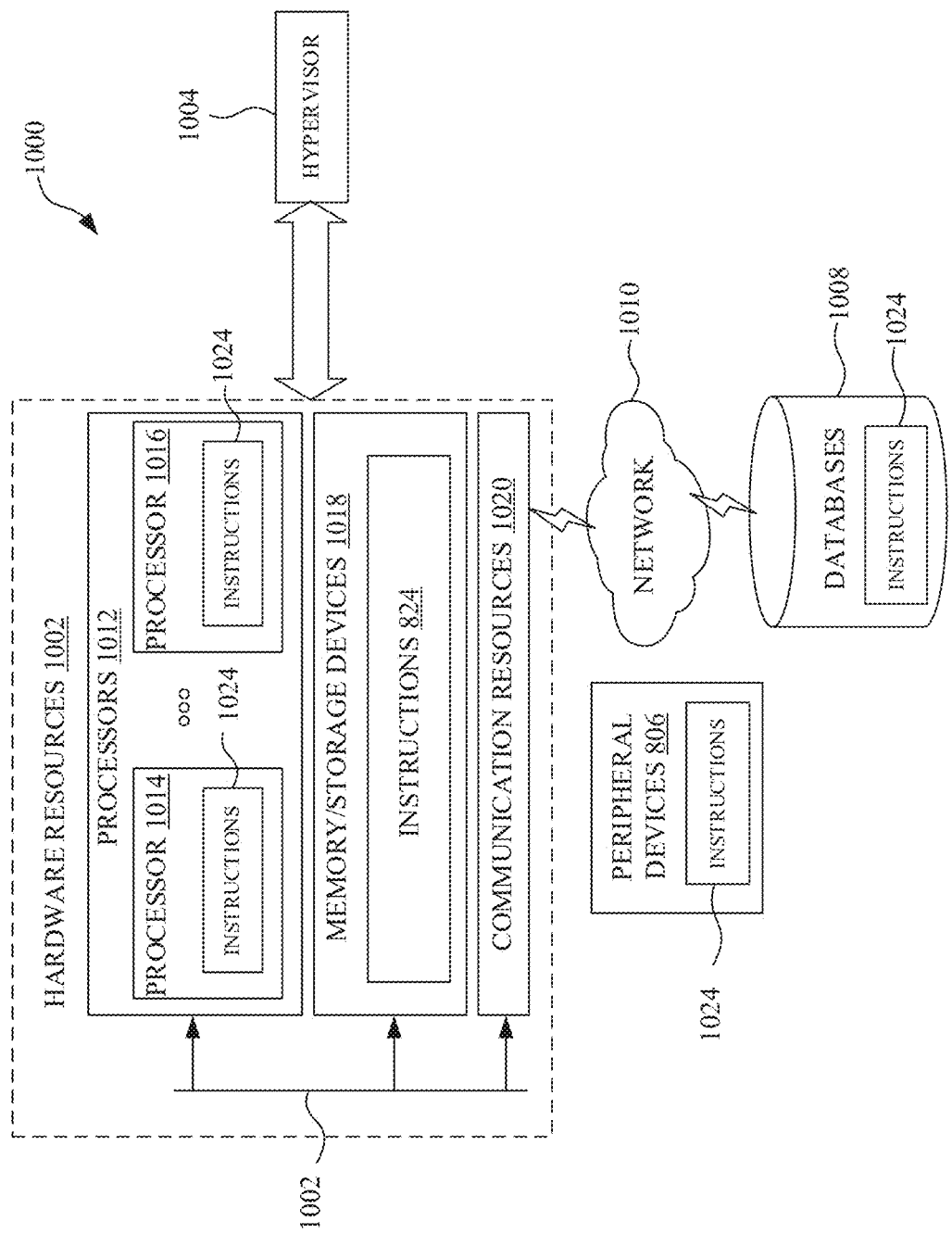
FIG. 10 illustrates components in accordance with some embodiments.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1012 (or processor cores), one or more memory/storage devices 1018, and one or more communication resources 1020, each of which may be communicatively coupled via a bus 1022. For embodiments where node virtualization (e.g., NFV) is utilized, a hypervisor 1004 may be executed to provide an execution environment for one or more network slices/sub-slices to utilize the hardware resources 1002.

The processors 1012 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1014 and a processor 1016.

The memory/storage devices 1018 may include main memory, disk storage, or any suitable combination thereof. The memory/storage devices 1018 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1020 may include interconnection or network interface components or other suitable devices to communicate with one or more peripheral devices 1006 or one or more databases 1008 via a network 1010. For example, the communication resources 1020 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1024 may include software, a program, an application, an applet, an app, or other executable code for causing at least any of the processors 1012 to perform any one or more of the methodologies discussed herein. The instructions 1024 may reside, completely or partially, within at least one of the processors 1012 (e.g., within the processor's cache memory), the memory/storage devices 1018, or any suitable combination thereof. Furthermore, any portion of the instructions 1024 may be transferred to the hardware resources 1002 from any combination of the peripheral devices 1006 or the databases 1008. Accordingly, the memory of the processors 1012, the memory/storage devices 1018, the peripheral devices 1006, and the databases 1008 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 11:
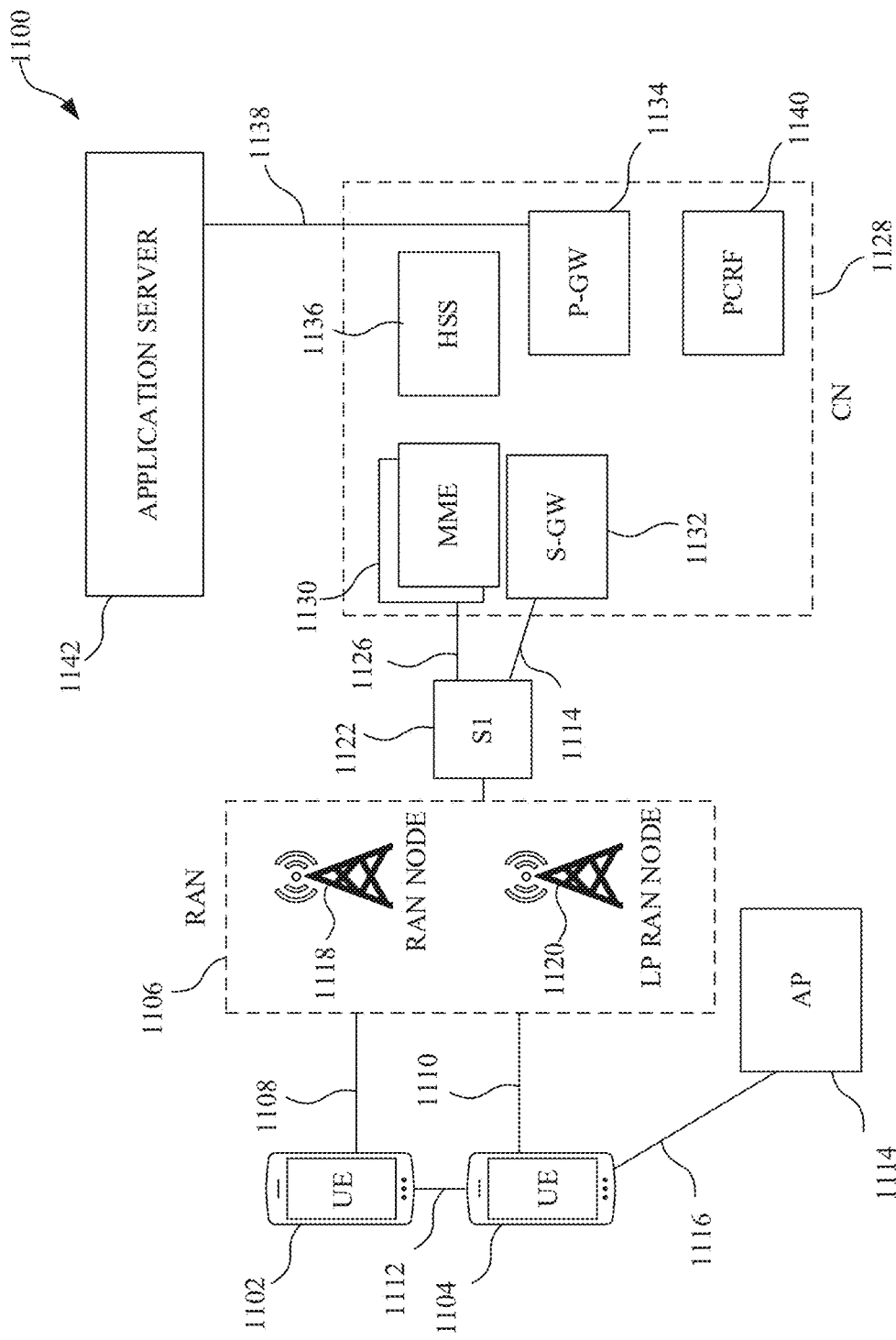
FIG. 11 illustrates an architecture of a wireless network in accordance with some embodiments.

FIG. 11 illustrates an architecture of a system 1100 of a network in accordance with some embodiments. The system 1100 includes one or more user equipment (UE), shown in this example as a UE 1102 and a UE 1104. The UE 1102 and the UE 1104 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, any of the UE 1102 and the UE 1104 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1102 and the UE 1104 may be configured to connect, e.g., communicatively couple, with a radio access network (RAN), shown as RAN 1106. The RAN 1106 may be, for example, an Evolved ETniversal Mobile Telecommunications System (ETMTS) Terrestrial Radio Access Network (E-UTRAN), a NextGen RAN (NG RAN), or some other type of RAN. The UE 1102 and the UE 1104 utilize connection 1108 and connection 1110, respectively, each of which includes a physical communications interface or layer (discussed in further detail below); in this example, the connection 1108 and the connection 1110 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1102 and the UE 1104 may further directly exchange communication data via a ProSe interface 1112. The ProSe interface 1112 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1104 is shown to be configured to access an access point (AP), shown as AP 1114, via connection 1116. The connection 1116 can include a local wireless connection, such as a connection consistent with any IEEE 802.11 protocol, wherein the AP 1114 would include a wireless fidelity (WiFi®) router. In this example, the AP 1114 may be connected to the Internet without connecting to the core network of the wireless system (described in further detail below).

The RAN 1106 can include one or more access nodes that enable the connection 1108 and the connection 1110. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1106 may include one or more RAN nodes for providing macrocells, e.g., macro RAN node 1118, and one or more RAN nodes for providing femtocells or picocells (e.g., cells having smaller coverage areas, smaller user capacity, or higher bandwidth compared to macrocells), e.g., a low power (LP) RAN node such as LP RAN node 1120.

Any of the macro RAN node 1118 and the LP RAN node 1120 can terminate the air interface protocol and can be the first point of contact for the UE 1102 and the UE 1104. In some embodiments, any of the macro RAN node 1118 and the LP RAN node 1120 can fulfill various logical functions for the RAN 1106 including, but not limited to, radio network controller (RNC) functions such as radio bearer management, uplink and downlink dynamic radio resource management and data packet scheduling, and mobility management.

In accordance with some embodiments, the UE 1102 and the UE 1104 can be configured to communicate using Orthogonal Frequency-Division Multiplexing (OFDM) communication signals with each other or with any of the macro RAN node 1118 and the LP RAN node 1120 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal sub carriers.

In some embodiments, a downlink resource grid can be used for downlink transmissions from any of the macro RAN node 1118 and the LP RAN node 1120 to the UE 1102 and the UE 1104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1102 and the UE 1104. The physical downlink control channel (PDCCH) may carry information about the transport format and resource allocations related to the PDSCH channel, among other things. It may also inform the UE 1102 and the UE 1104 about the transport format, resource allocation, and H-ARQ (Hybrid Automatic Repeat Request) information related to the uplink shared channel. Typically, downlink scheduling (assigning control and shared channel resource blocks to the UE 1104 within a cell) may be performed at any of the macro RAN node 1118 and the LP RAN node 1120 based on channel quality information fed back from any of the UE 1102 and UE 1104. The downlink resource assignment information may be sent on the PDCCH used for (e.g., assigned to) each of the UE 1102 and the UE 1104.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1106 is communicatively coupled to a core network (CN), shown as CN 1128—via an S1 interface 1122. In embodiments, the CN 1128 may be an evolved packet core (EPC) network, a NextGen Packet Core (NPC) network, or some other type of CN. In this embodiment the S1 interface 1122 is split into two parts: the S1-U interface 1124, which carries traffic data between the macro RAN node 1118 and the LP RAN node 1120 and a serving gateway (S-GW), shown as S-GW 1132, and an S1-mobility management entity (MME) interface, shown as S1-MME interface 1126, which is a signaling interface between the macro RAN node 1118 and LP RAN node 1120 and the MME(s) 1130.

In this embodiment, the CN 1128 includes the MME(s) 1130, the S-GW 1132, a Packet Data Network (PDN) Gateway (P-GW) (shown as P-GW 1134), and a home subscriber server (HSS) (shown as HSS 1136). The MME(s) 1130 may be similar in function to the control plane of legacy Serving General Packet Radio Service (GPRS) Support Nodes (SGSN). The MME(s) 1130 may manage mobility aspects in access such as gateway selection and tracking area list management. The HSS 1136 may include a database for network users, including subscription-related information to support the network entities' handling of communication sessions. The CN 1128 may include one or several HSS 1136, depending on the number of mobile subscribers, on the capacity of the equipment, on the organization of the network, etc. For example, the HSS 1136 can provide support for routing/roaming, authentication, authorization, naming/addressing resolution, location dependencies, etc.

The S-GW 1132 may terminate the S1 interface 1122 towards the RAN 1106, and routes data packets between the RAN 1106 and the CN 1128. In addition, the S-GW 1132 may be a local mobility anchor point for inter-RAN node handovers and also may provide an anchor for inter-3 GPP mobility. Other responsibilities may include lawful intercept, charging, and some policy enforcement.

The P-GW 1134 may terminate an SGi interface toward a PDN. The P-GW 1134 may route data packets between the CN 1128 (e.g., an EPC network) and external networks such as a network including the application server 1142 (alternatively referred to as application function (AF)) via an Internet Protocol (IP) interface (shown as IP communications interface 1138). Generally, an application server 1142 may be an element offering applications that use IP bearer resources with the core network (e.g., ETMTS Packet Services (PS) domain, LTE PS data services, etc.). In this embodiment, the P-GW 1134 is shown to be communicatively coupled to an application server 1142 via an IP communications interface 1138. The application server 1142 can also be configured to support one or more communication services (e.g., Voice-over-Internet Protocol (VoIP) sessions, PTT sessions, group communication sessions, social networking services, etc.) for the UE 1102 and the UE 1104 via the CN 1128.

The P-GW 1134 may further be a node for policy enforcement and charging data collection. A Policy and Charging Enforcement Function (PCRF) (shown as PCRF 1140) is the policy and charging control element of the CN 1128. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1140 may be communicatively coupled to the application server 1142 via the P-GW 1134. The application server 1142 may signal the PCRF 1140 to indicate a new service flow and select the appropriate Quality of Service (QoS) and charging parameters. The PCRF 1140 may provision this rule into a Policy and Charging Enforcement Function (PCEF) (not shown) with the appropriate traffic flow template (TFT) and QoS class of identifier (QCI), which commences the QoS and charging as specified by the application server 1142.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method performed by a user equipment (UE), the method comprising: performing at least one of: reporting, to a base station (BS), a UE capability related to port selection codebooks, in accordance with a determination that an active bandwidth part (BWP) has less than a threshold number of physical resource blocks (PRBs), operating according to a rule that the UE is not expected to report, to the BS, the port selection codebooks, or in accordance with a determination that the active BWP has less than the threshold number of PRBs and that the UE is configured with the port selection codebooks by the BS, assuming that a subset of parameters has a predefined value, wherein the parameters comprise a number, M, of selected frequency basis, a percentage, $\alpha$, of number of selected ports, a percentage, $\beta$, of number of reported non-zero coefficients, and a number, R, of PMI sub-bands per CQI sub-band.

Example 2 is the method of Example 1, wherein the UE capability related to the port selection codebooks comprises at least one of:

a UE capability related to parameter combinations, the parameter combinations comprising:
M=1, $\alpha$=1, and B=1;
M=1, $\alpha$=1, and B=¾;
M=1, $\alpha$=1, and B=½;
M=1, $\alpha$=¾, and B=½;
M=2, $\alpha$=1, and B=¾;
M=2, $\alpha$=1, and B=½;
M=2, $\alpha$=¾, and B=½; and
M=2, $\alpha$=½, and B=½;
a UE capability related to sub-band oversampling with R=2; or
a UE capability related to concurrent mixed codebook.

Example 3 is the method of Example 2, wherein the UE capability related to the port selection codebooks comprises the UE capability related to parameter combinations.

Example 4 is the method of Example 3, wherein the reporting comprises reporting support of each of the parameter combinations independently in accordance with a determination that the UE supports the port selection codebooks.

Example 5 is the method of Example 4, wherein the support of the parameter combinations is reported using an 8-bit bitmap.

Example 6 is the method of Example 3, wherein the UE is mandated to support a subset of the parameter combinations as basic parameter settings in accordance with a determination that the UE supports the port selection codebooks.

Example 7 is the method of Example 6, wherein the basic parameter settings include the parameter combinations in which M=1.

Example 8 is the method of Example 3, wherein the reporting comprises separately reporting whether the UE supports at least one of the parameter combinations in which M=2 in accordance with a determination that the UE supports the port selection codebooks.

Example 9 is the method of Example 8, wherein, in accordance with a determination that the UE supports at least one of the parameter combinations in which M=2, the UE is to support all the parameter combinations in which M=2.

Example 10 is the method of Example 8, wherein, in accordance with a determination that the UE supports at least one of the parameter combinations in which M=2, the UE is to separately report whether the UE supports $\beta$=¾, or B=½.

Example 11 is the method of Example 8, wherein, in accordance with a determination that the UE supports at least one of the parameter combinations in which M=2, the UE is to separately report whether the UE supports $\alpha$=1, $\alpha$=¾, or $\alpha$=½.

Example 12 is the method of Example 8, wherein, in accordance with a determination that the UE supports at least one of the parameter combinations in which M=2, the UE is to report that the UE supports which one or more of the parameter combinations in which M=2 using a bitmap.

Example 13 is the method of Example 12, wherein the bitmap is a 4-bit bitmap.

Example 14 is the method of Example 2, wherein the UE capability related to the port selection codebooks comprises the UE capability related to sub-band oversampling with R=2.

Example 15 is the method of Example 14, wherein, in accordance with a determination that the UE supports R=2 for the port selection codebooks, the reporting comprises separately reporting at least one list of triplets related to UE complexity, wherein each triplet includes {a maximum number of transmit (Tx) ports in one channel state information reference signal (CSI-RS) resource, a maximum number of CSI-RS resources, a total number of Tx ports in all CSI-RS resources} across all component carriers (CCs).

Example 16 is the method of Example 15, wherein the at least one list of triplets comprises only one list of triplets which is same for the parameter combinations in which M=1 and the parameter combinations in which M=2.

Example 17 is the method of Example 15, wherein the at least one list of triplets comprises two lists of triplets, one of the two lists of triplets for the parameter combinations in which M=1, another one of the two lists of triplets for the parameter combinations in which M=2.

Example 18 is the method of Example 14, wherein, in accordance with a determination that the UE supports R=2 for the port selection codebooks, the reporting comprises reporting that the UE supports R=2 irrespective of a value of M.

Example 19 is the method of Example 14, wherein, in accordance with a determination that the UE supports R=2 for the port selection codebooks, the reporting comprises independently reporting whether the UE supports R=2 for the parameter combinations in which M=1 or the parameter combinations in which M=2.

Example 20 is the method of Example 14, wherein, in accordance with a determination that the UE supports R=2 for the port selection codebooks, the UE is not to report a list of triplets related to UE complexity, wherein the UE supports a same list of triplets related to the UE complexity irrespective of R=1 or R=2.

Example 21 is the method of Example 14, wherein, in accordance with a determination that the UE supports R=2 for the port selection codebooks, the reporting comprises reporting that the UE only supports R=2 for a subset of the parameter combinations.

Example 22 is the method of Example 21, wherein the subset of the parameter combinations includes the parameter combinations in which M=2.

Example 23 is the method of Example 2, wherein the UE capability related to the port selection codebooks comprises the UE capability related to concurrent mixed codebook.

Example 24 is the method of Example 23, wherein the reporting comprises reporting whether the UE supports the BS to configure concurrent mixed codebook involving the port selection codebooks.

Example 25 is the method of Example 24, wherein, in accordance with a determination that the UE supports the BS to configure the concurrent mixed codebook involving the port selection codebooks, the UE is to report a list of supported codebook pairs.

Example 26 is the method of Example 25, wherein one entry of each codebook pair is a Rel-17 codebook, and another entry of each codebook pair is subject to a restriction comprising at least one of: that another entry is not a 3GPP release 15 (Rel-15 ) port selection codebook or a 3GPP release 16 (Rel-16 ) port selection codebook, or that another entry is of at least one of following codebook types: Rel-15 Type I Single Panel, Rel-15 Type I Multi Panel, Rel-15 Type II, or Rel-16 Type II.

Example 27 is the method of Example 23, wherein, in accordance with a determination that the UE does not report a capability of supporting the BS to configure the concurrent mixed codebook involving the port selection codebooks, or that the reported capability does not contain a given codebook pair, the UE is to measure different codebooks in the given codebook pair at non-overlapping time.

Example 28 is the method of Example 24, wherein, in accordance with a determination that the UE supports the BS to configure the concurrent mixed codebook involving the port selection codebooks, the UE is to report at least one list of triplets related to UE complexity, wherein each triplet includes {a maximum number of transmit (Tx) ports in one channel state information reference signal (CSI-RS) resource, a maximum number of CSI-RS resources, a total number of Tx ports in all CSI-RS resources} across all component carriers (CCs).

Example 29 is the method of Example 28, wherein only one list of triplets is reported and applies to all supported codebook pairs.

Example 30 is the method of Example 28, wherein a separate list of triplets is reported for each supported codebook pair independently.

Example 31 is the method of Example 28, wherein a separate list of triplets is reported for each codebook in each supported codebook pair independently.

Example 32 is the method of Example 31, wherein multiple pairs of the list of triplets are reported for each codebook pair.

Example 33 is the method of any one of Examples 1-32, wherein the threshold number is 24.

Example 34 is a method performed by a base station (BS), the method comprising: performing at least one of: receiving, from a user equipment (UE), a report of a UE capability related to port selection codebooks, in accordance with a determination that an active bandwidth part (BWP) has less than a threshold number of physical resource blocks (PRBs), operating according to a rule that the BS shall not configure the UE to report the port selection codebooks, or in accordance with a determination that the active BWP has less than the threshold number of PRBs and that the UE is configured with the port selection codebooks by the BS, configuring the UE with a subset of parameters, wherein the parameters comprise a number, M, of selected frequency basis, a percentage, $\alpha$, of number of selected ports, a percentage, $\beta$, of number of reported non-zero coefficients, and a number, R, of PMI sub-bands per CQI sub-band.

Example 35 is the method of Example 34, wherein the UE capability related to the port selection codebooks comprises at least one of:
 a UE capability related to parameter combinations, the parameter combinations comprising:
  M=1, $\alpha$=1, and =1;
  M=1, $\alpha$=1, and B=¾;
  M=1, $\alpha$=1, and B=½;
  M=1, $\alpha$=¾, and B=½;
  M=2, $\alpha$=1, and B=¾;
  M=2, $\alpha$=1, and B=½;
  M=2, $\alpha$=¾, and B=½; and
  M=2, $\alpha$=½, and B=½;
 a UE capability related to sub-band oversampling with R=2; or
 a UE capability related to concurrent mixed codebook.

Example 36 is the method of Example 35, wherein the UE capability related to the port selection codebooks comprises the UE capability related to parameter combinations.

Example 37 is the method of Example 36, wherein the UE supports the port selection codebooks, and the report of the UE capability indicates support of each of the parameter combinations independently.

Example 38 is the method of Example 36, wherein the UE supports the port selection codebooks, and the UE is mandated to support a subset of the parameter combinations as basic parameter settings.

Example 39 is the method of Example 36, wherein the UE supports the port selection codebooks, and the report of the UE capability indicates whether the UE supports at least one of the parameter combinations in which M=2.

Example 40 is the method of Example 35, wherein the UE capability related to the port selection codebooks comprises the UE capability related to sub-band oversampling with R=2.

Example 41 is the method of Example 40, wherein the UE supports R=2 for the port selection codebooks, and the report of the UE capability indicates at least one list of triplets related to UE complexity, wherein each triplet includes {a maximum number of transmit (Tx) ports in one channel state information reference signal (CSI-RS) resource, a maximum number of CSI-RS resources, a total number of Tx ports in all CSI-RS resources} across all component carriers (CCs).

Example 42 is the method of Example 41, wherein the at least one list of triplets comprises only one list of triplets which is same for the parameter combinations in which M=1 and the parameter combinations in which M=2.

Example 43 is the method of Example 41, wherein the at least one list of triplets comprises two lists of triplets, one of the two lists of triplets for the parameter combinations in which M=1, another one of the two lists of triplets for the parameter combinations in which M=2.

Example 44 is the method of Example 40, wherein the UE supports R=2 for the port selection codebooks, and the report of the UE capability indicates that the UE supports R=2 irrespective of a value of M.

Example 45 is the method of Example 40, wherein the UE supports R=2 for the port selection codebooks, and the report of the UE capability independently indicates whether the UE supports R=2 for the parameter combinations in which M=1 or the parameter combinations in which M=2.

Example 46 is the method of Example 40, wherein the UE supports R=2 for the port selection codebooks, and the report of the UE capability does not indicate a list of triplets related to UE complexity, wherein the UE supports a same list of triplets related to the UE complexity irrespective of R=1 or R=2.

Example 47 is the method of Example 40, wherein the UE supports R=2 for the port selection codebooks, and the report of the UE capability indicates that the UE only supports R=2 for a subset of the parameter combinations.

Example 48 is the method of Example 35, wherein the UE capability related to the port selection codebooks comprises the UE capability related to concurrent mixed codebook.

Example 49 is the method of Example 48, wherein the report of the UE capability indicates whether the UE supports the BS to configure concurrent mixed codebook involving the port selection codebooks.

Example 50 is the method of Example 48, wherein the report of the UE capability does not include a report of a capability of supporting the BS to configure the concurrent mixed codebook involving the port selection codebooks, or does not contain a given codebook pair.

Example 51 is the method of Example 49, wherein the UE supports the BS to configure the concurrent mixed codebook involving the port selection codebooks, and the report of the UE capability indicates at least one list of triplets related to UE complexity, wherein each triplet includes {a maximum number of transmit (Tx) ports in one channel state information reference signal (CSI-RS) resource, a maximum number of CSI-RS resources, a total number of Tx ports in all CSI-RS resources} across all component carriers (CCs).

Example 52 is the method of any one of Examples 34-51, wherein the threshold number is 24.

Example 53 is an apparatus for a user equipment (UE), the apparatus comprising one or more processors configured to perform the method of any of Examples 1 to 33.

Example 54 is an apparatus for a base station (BS), the apparatus comprising one or more processors configured to perform the method of any of Examples 34 to 52.

Example 55 is an apparatus for a communication device, comprising means for performing the method of any of Examples 1 to 52.

Example 56 is a computer readable medium having computer programs stored thereon which, when executed by an apparatus having one or more processors, cause the apparatus to perform the method of any of Examples 1 to 52.

Example 57 is a computer program product comprising computer programs which, when executed by an apparatus having one or more processors, cause the apparatus to perform the method of any of Examples 1 to 52.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. One or more non-transitory, computer-readable media having instructions that, when executed, cause processor circuitry to:
   generate a user equipment (UE) capability report to indicate that a UE supports a further enhanced type II port selection codebook and a plurality of parameter combinations that include a number of selected frequency bases equal to two, wherein individual parameter combinations of the plurality of parameter combinations include the number of selected frequency bases, a percentage of a number of selected ports, and a percentage of a number of reporting non-zero coefficients; and
   output the UE capability report for transmission to a base station (BS).

2. The one or more non-transitory, computer-readable media of claim 1, wherein combinations include the number of selected frequency bases, a percentage of a number of the plurality of parameter combinations is a first plurality, a second plurality of parameter combinations are defined, and the first plurality includes all parameter combinations of the second plurality that include the number of selected frequency bases.

3. The one or more non-transitory, computer-readable media of claim 1, wherein the plurality of parameter combinations include a first parameter combination with the percentage of the number of selected ports equal to one and the percentage of the number of reporting non-zero coefficients equal to ¾.

4. The one or more non-transitory, computer-readable media of claim 3, wherein the plurality of parameter combinations further include a second parameter combination with the percentage of the number of selected ports equal to one and the percentage of the number of reporting non-zero coefficients equal to ½.

5. The one or more non-transitory, computer-readable media of claim 4, wherein the plurality of parameter combinations further include a third parameter combination with the percentage of the number of selected ports equal to ¾ and the percentage of the number of reporting non-zero coefficients equal to ½.

6. The one or more non-transitory, computer-readable media of claim 5, wherein the plurality of parameter combinations further include a fourth parameter combination with the percentage of the number of selected ports equal to ½ and the percentage of the number of reporting non-zero coefficients equal to ½.

7. A method comprising:
  receiving, from a user equipment (UE), a first UE capability indication to indicate that the UE supports a subband oversampling parameter equal to two;
  receiving, from the UE, a second UE capability indication related to support of channel state information-reference signal (CSI-RS) resources, the second UE capability indication to identify one or more sets of values that are supported by the UE, wherein a first set of values of the one or more sets of values includes a maximum number of transmit ports in one CSI-RS resource, a maximum number of CSI-RS resources, and a total number of transmit ports in all CSI-RS resources; and
  generating a configuration to configure the UE based on the first and second UE capability indications.

8. The method of claim 7, wherein the one or more sets of values respectively correspond to one or more triplets.

9. The method of claim 7, wherein the first set of values is across all component carriers.

10. The method of claim 7, wherein the subband oversampling parameter is associated with a number of precoding matrix indicator (PMI) subbands configured per CSI subband.

11. The method of claim 7, wherein the first and second UE capability indications are separately indicated.

12. The method of claim 7, wherein the one or more sets of values are supported by the UE when a number of selected frequency bases is equal to one or two.

13. The method of claim 7, wherein the one or more sets of values is a first one or more sets of values that are supported by the UE when a number of selected frequency bases is equal to one and the method further comprises:
  determining a second one or more sets of values that are supported by the UE when the number of selected frequency bases is equal to two.

14. An apparatus comprising:
  processing circuitry the processing circuitry to:
    generate a user equipment (UE) capability report with an indication of whether a UE supports configuration of a plurality of concurrent port selection (PS) codebooks, wherein the UE capability report further includes a UE capability indication related to support of channel state information-reference signal (CSI-RS) resources, the UE capability indication to identify one or more sets of values that are supported by the UE, wherein a first set of values of the one or more sets of values includes a maximum number of transmit ports in one CSI-RS resource, a maximum number of CSI-RS resources, and a total number of transmit ports in all CSI-RS resources; and
    output the UE capability report for transmission to a base station; and
  interface circuitry coupled with the processing circuitry to enable communication.

15. The apparatus of claim 14, wherein the indication is to indicate that the UE supports one or more pairs of PS codebooks.

16. The apparatus of claim 15, wherein each pair of the one or more pairs of PS codebooks includes a Release-17 PS codebook.

17. The apparatus of claim 15, wherein a first pair of the one or more pairs of PS codebooks includes a type I single-panel PS codebook, a type I multi-panel PS codebook, a Release-15 type II PS codebook, or a Release-16 type II PS codebook.

18. The apparatus of claim 15, wherein the UE capability indication is to identify the one or more sets of values that are supported by the UE for a first pair of the one or more pairs of PS codebooks.

19. The apparatus of claim 18, wherein the UE capability indication is a first UE capability indication and the UE capability report further includes a second UE capability indication related to support of CSI-RS resources, the second UE capability indication to identify at least one set of values that is supported by the UE for a second pair of the one or more pairs of PS codebooks.

* * * * *